(12) United States Patent
Noé et al.

(10) Patent No.: US 7,908,948 B2
(45) Date of Patent: Mar. 22, 2011

(54) METHOD OF TRIMMING STRIP, ESPECIALLY HOT ROLL METAL STRIP

(75) Inventors: Andreas Noé, Kerken (DE); Rolf Noé, Mülheim/Ruhr (DE); Dieter Baukloh, Duisburg (DE)

(73) Assignee: BWG Bergwerk-und Walzwerk-Maschinenbau GmbH, Duisburg (DE)

( * ) Notice: Subject to any disclaimer, the term of this patent is extended or adjusted under 35 U.S.C. 154(b) by 1826 days.

(21) Appl. No.: 10/793,472

(22) Filed: Mar. 4, 2004

(65) Prior Publication Data

US 2004/0168556 A1    Sep. 2, 2004

Related U.S. Application Data

(62) Division of application No. 10/062,297, filed on Feb. 1, 2002, now abandoned.

(30) Foreign Application Priority Data

Oct. 10, 2001   (EP) .................................... 01124104

(51) Int. Cl.
*B26D 3/00* (2006.01)
*B26D 5/20* (2006.01)
(52) U.S. Cl. ................. 83/35; 83/76.8; 83/368; 83/433; 83/732
(58) Field of Classification Search ................ 83/34–36, 83/732, 433, 76.8, 425.2, 498, 675, 368
See application file for complete search history.

(56) References Cited

U.S. PATENT DOCUMENTS 3,668,959 A * 6/1972 Richter et al. .................... 83/48
5,381,342 A * 1/1995 Noe .............................. 700/192

* cited by examiner

*Primary Examiner* — Boyer D Ashley
(74) *Attorney, Agent, or Firm* — Andrew Wilford

(57) ABSTRACT

Sensors of the longitudinal edges and/or the width of hot roll metal strip are located immediately ahead of the trimming blades and are used to transversely adjust the trimming heads and/or the centerline position for the strip so that in subsequent trimming operations, the trim widths are identical at both sides. The cutting heads can be positioned in indentations at junctions between the successive segments of the strip.

7 Claims, 4 Drawing Sheets

METHOD OF TRIMMING STRIP, ESPECIALLY HOT ROLL METAL STRIP

CROSS REFERENCE TO RELATED APPLICATION

This application is a division of Ser. No. 10/062,297 filed 1 Feb. 2002 (now abandoned).

SPECIFICATION

1. Field of the Invention

Our present invention relates to a method of and an apparatus for the trimming of strip, especially hot rolled metal strip, in a so-called trimming shear in which shear heads are provided along opposite longitudinal edges of the path of the strip and contain respective cutting blades.

2. Background of the Invention

The trimming of metal strip is described, inter alia, in European Patent 0 556 462 B1 and European Patent application 0 021 821 A1, the latter having been published 7 Jan. 1981. The control of the trimming shear during the course of trimming, especially for hot rolled metal strip, utilizing trimming heads on opposite longitudinal sides of the strip and displaceable transversely to the direction of travel of the strip and in the direction of the width thereof and sensors for detecting well upstream of the trimming heads such parameters as the strip width, the paths of the strip edges and edge floors at the junctions at which successive segments of the strip are connected together as well as the irregularities in the regions of both strip edges. These parameters are detected continuously during the trimming process in, for example in EP 0 556 462 B1. The trimming heads are displaced in response to the detected irregularities and in accordance with the measurements made so that trim along each edge is removed to leave a final strip width based upon calculations from the measured parameters.

It is also known to provide sensors for detecting the strip edges immediately upstream of the trimming shear and for that purpose a plurality of sensors are provided on each side of the strip (compare EP 0 021 821 A1). The displaceable cutting heads are so adjusted in this case during the trimming operation. In this latter case there is no centerline adjustment of the strip and it is possible that during an adjustment, the width of the trim removed will fall below a minimum permissible width and that the trim on one side or the other will taper off and require repositioning of the strip on the trim line. As a result, there is also danger that the reliability of the trimming operation may fail and that with operation in the manner described, there will be lengths of the strip in which the desired or final strip width is not successfully achieved.

OBJECTS OF THE INVENTION

It is, therefore, the principal object of the present invention to provide a method of and an apparatus for the trimming of metal strip, especially hot roll metal strip, whereby the aforementioned drawbacks are avoided and the trimming is optimized in the sense that waste is reduced to a minimum and interruptions of the trimming operation are likewise reduced or eliminated.

It is a more specific object of this invention to provide a method of trimming strip and especially hot roll metal strip in which the detection of the strip edges and the trimming based upon that edge detection is optimized.

Still another object of this invention is to provide a trimming operation or method of operating a trimming shear where the danger that the trimming shear will run off an edge of the strip or that an edge of the strip will disengage from the trimming shear is minimized.

SUMMARY OF THE INVENTION

These objects are attained, in accordance with the invention in a method of trimming longitudinal edges from metal strip, especially hot roll metal strip which comprises the steps of:

(a) advancing metal strip to be trimmed along longitudinal edges of the strip along a trimming path in a longitudinal direction and engaging the strip at each longitudinal side thereof with a respective trimming shear head, thereby cutting a respective trim from the respective side along the respective longitudinal edge;

(b) measuring positions of the longitudinal edges and optionally a width of the strip at a location immediately upstream in the direction of the respective heads; and (c) prior to engaging blades of the trimming heads with the strip for cutting trim of a given width from the strip, adjusting positions of the heads based upon results of the measurement in step (b) in a direction of the width of the strip and then engaging the blades with the strip.

Where, in addition, the shear is provided with a mechanism for adjusting the position of the metal strip relative to the path thereof and to the trimming heads, the method can comprise the steps of:

(a) advancing metal strip to be trimmed along longitudinal edges of the strip along a trimming path in a longitudinal direction and engaging said strip at each longitudinal side thereof with a respective trimming shear head, thereby cutting a respective trim from the respective side along the respective longitudinal edge;

(b) measuring positions of the longitudinal edges and optionally a width of the strip at a location immediately upstream in said direction of the respective heads; and (c) adjusting a position of a centerline of said strip based upon results of the measurement in step (b), before, after or during engagement of blades of said shear heads with said strip whereby said strip centerline is positioned relative to the shear heads and blades thereof.

The invention solves the problems mentioned previously in accordance with a first embodiment in that the positions of the strip edges and optionally the strip width of the strip fed into the trimming shear are measured directly ahead of the cutting heads or their blades and in that the cutting heads before the blades thereof engage the strip are positioned with reference to the strip width by the measurement signals resulting from the measurements.

In accordance with another embodiment of the invention, where the shear is provided upstream of the trimming blades where the centerline control unit for the strip, the invention achieves the objects described in that the positions of the strip edges and optionally the strip width of the strip delivered to the shear are measured directly ahead of the cutting heads or their blades and the centerline adjusting unit is actuated prior to or after engagement of the blades with the strip for cutting trim strips of predetermined width directly from the results of the measurements of the strip with respect to the strip center. The centerline positioning thus shifts the strip to recess the location of the centerline along the path. The centerline positioner thus shifts the strip relative to the cutting heads or the blades thereof.

According to the invention, a combination of the two is also possible in that the measurement signals can be used for positioning the cutting heads in the direction of the width of the strip and/or the centerline of the strip can be centered relative to the cutting heads or the cutting blades via the centerline control unit.

In all cases, however, the cutting edge detection is effected immediately upstream of the cutting heads or their blades and in the trimming shear itself so that various detrimental influences like strip canting or camber or like irregularities are of negligible effect and do not create trimming problems. When adjustment of the strip centerline position is insufficient to guarantee the minimum widths of the trimming strips and the final strip width with the requisite precision, the adjustment of the positions of the cutting heads can be used to achieve that precision. Conversely, when the adjustment of the trim heads themselves does not suffice, the centerline adjusting unit can be used to achieve the requisite precision. In either case, the strip edge detection and the trimming of the strip, especially metal strip is optimized.

According to a feature of the invention, individual strip segments are joined end to end to form a continue or endless strip having longitudinal edge indentations or cut outs at each junction between individual strip segments. In that case, the strip can be brought to standstill with the cutting or trimming heads located in these indentations so that the blades of the shear heads disengage from the strip. The positions of the shear heads or the centerline are readjusted during the standstill of the strip while the heads are located in the indentations and for a subsequent severing of trim of a given width of the strip.

Preferably the trim on opposite sides of the strip are of equal width.

For continuous, endless or very long strips, according to the invention, the beginning or leading edge of the strip is brought to a standstill ahead of the trimming heads or blades and any possible offset of the centerline of the strip relative to the trimming heads is adjusted during the standstill to establish the new final strip width and so that in the course of trimming, i.e. during travel of the strip, trim strips of predetermined and preferably equal width will be cut off.

Since the measuring position is directly upstream of the cutting blades, the blades can be automatically so positioned in the cut outs that trim strips of equal width are severed. With endlessly long strips which may not have such cut outs there is an automatic positioning of the trim heads and their blades before the leading edge of the strip is advanced through the shear. The trimming waste, which corresponds to twice the width of a trimming strip is thereby minimized. The result is a saving in material without the fear of a disruption of the trimming process.

Furthermore, according to the invention after adjustment of the trimming heads and thus their cutting blades and renewed advance of the strip in the course of trimming any possible tendency to offset of the centerline of the strip can be contacted and brought to zero so that the strip will run with a centerline centered between the cutting blades. The set point values for the trimming heads and the centerline positioning are restored to their positions with respect to the center of the apparatus. Problems with respect to the run off of the trim strip with cambered strip or offcentered leading edges of the strip are eliminated with the system of the invention. Because it is possible to reduce to a minimum the trimming waste and increases the reliability, the present invention also results in the saving with respect to labor costs and in both operation and in servicing of the equipment.

The invention also provides an apparatus for the trimming of strip which can comprise:

means for advancing metal strip to be trimmed along longitudinal edges of the strip along transport path in a longitudinal direction;

a respective shear head engageable with the strip at each longitudinal side thereof for cutting a respective trim from the respective side along the respective longitudinal edge; and sensors for measuring positions of the longitudinal edges, a width of the strip and edge flaws at a location immediately upstream in the direction of the respective heads.

The measuring devices or sensors can be optical sensors (photocells, lasers) or electrical sensors (inductive or capacitive sensors). The use of CCD cameras as sensors is conceivable as well. The measuring devices are preferably shiftable relative to the trimming heads in the direction of the strip width so that the strip edges can be automatically detected. The trimming heads themselves can be adjusted in this direction independently from one another.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
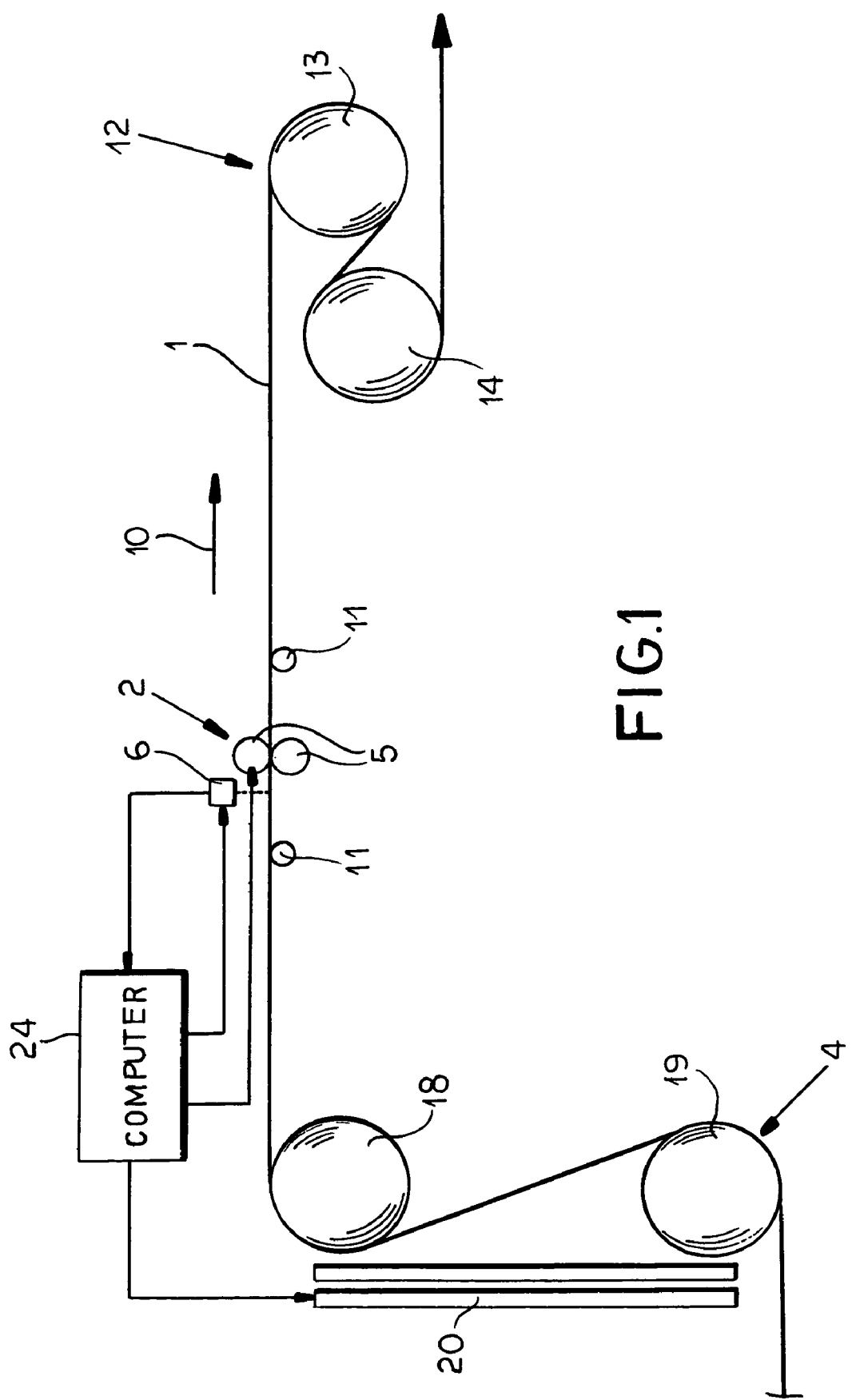
FIG. 1 is a schematic side elemental view illustrating a trimming apparatus in accordance with the invention.
Figure 2:
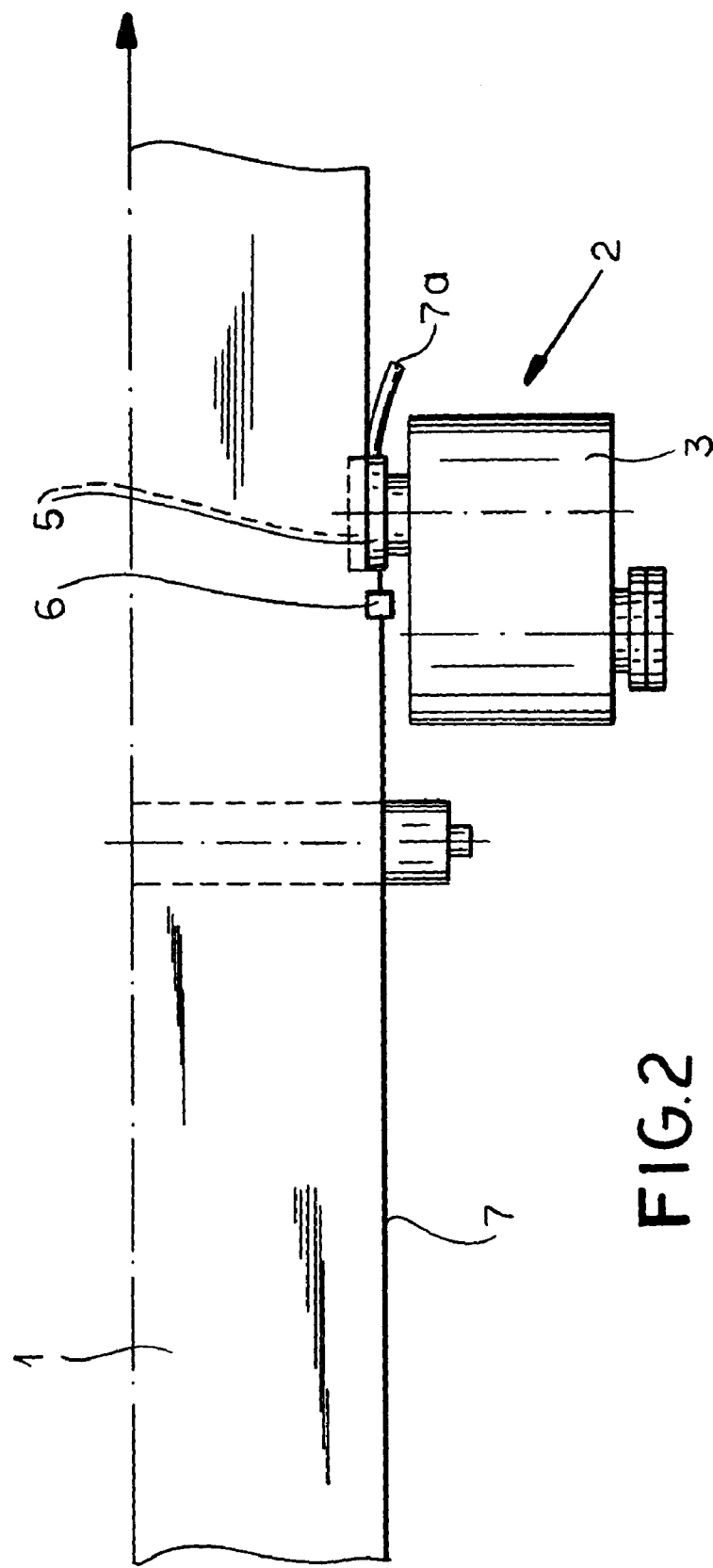
FIG. 2 is a plan view of a portion of that apparatus.

The drawing shows an apparatus for trimming metal strip 1 and, especially, hot rolled metal strip. The apparatus is a trimming shear 2 which is provided with means for transporting the strip which can be any conveyor system, e.g. a roll conveyor, or any other conveyor for supporting the strip while it is displaced in the transport or longitudinal direction 10. The transport and conveyor system are represented by the rollers 11. To displace the strip, we may use a bridle 12 which has two rolls 13 and 14 so positioned that the strip passes around both of the rolls 13, 14, over more than 180°.

Figure 4:
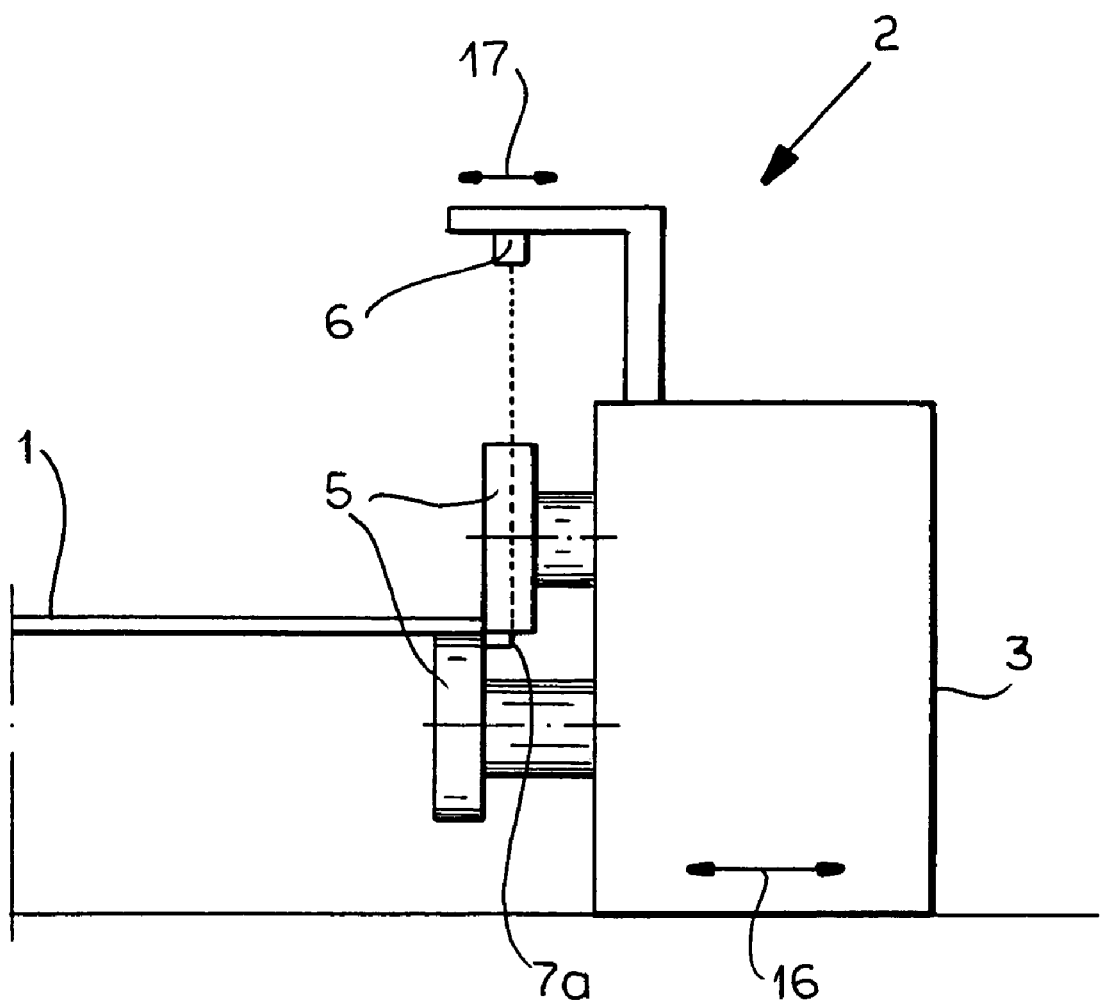
FIG. 4 is a side elevational view through one half of the strip in the region of a trimming head and illustrating a measuring element or sensor displaceable in the strip, width direction.

The trimmer 2 has two trimming or cutting heads 3 each of which is displaceable transversely of the strip, i.e. in the direction 16 of the width and comprises a pair of cutters, such as the cutting blades 5 which are so driven that they cut a trim 7a (FIG. 4) from each longitudinal edge 7 of the strip which is originally of the width B to leave a strip with a finished strip b (see FIG. 5) edge can have floors which have not been shown in detail.

Immediately upstream of the blades 5 of the cutting head 3 are sensors or measuring devices 6 which can detect the strip edges 7, the strip width B and the aforementioned floors along the strip edge which may be projections of the strip or irregularities therein.

The measuring devices 6 themselves can be displaceable in a direction 17 in the web width. The sensors can be optical or electrical sensors. The heads 3 can be displaceable in the direction of the double headed arrow 16 independently. As can be seen from FIG. 1, the strip 1 can also pass around rollers 18 and 19 of a centerline adjuster 4 which can have an actuator 20 capable of shifting the centerline 21 of the strip.

Figure 3:
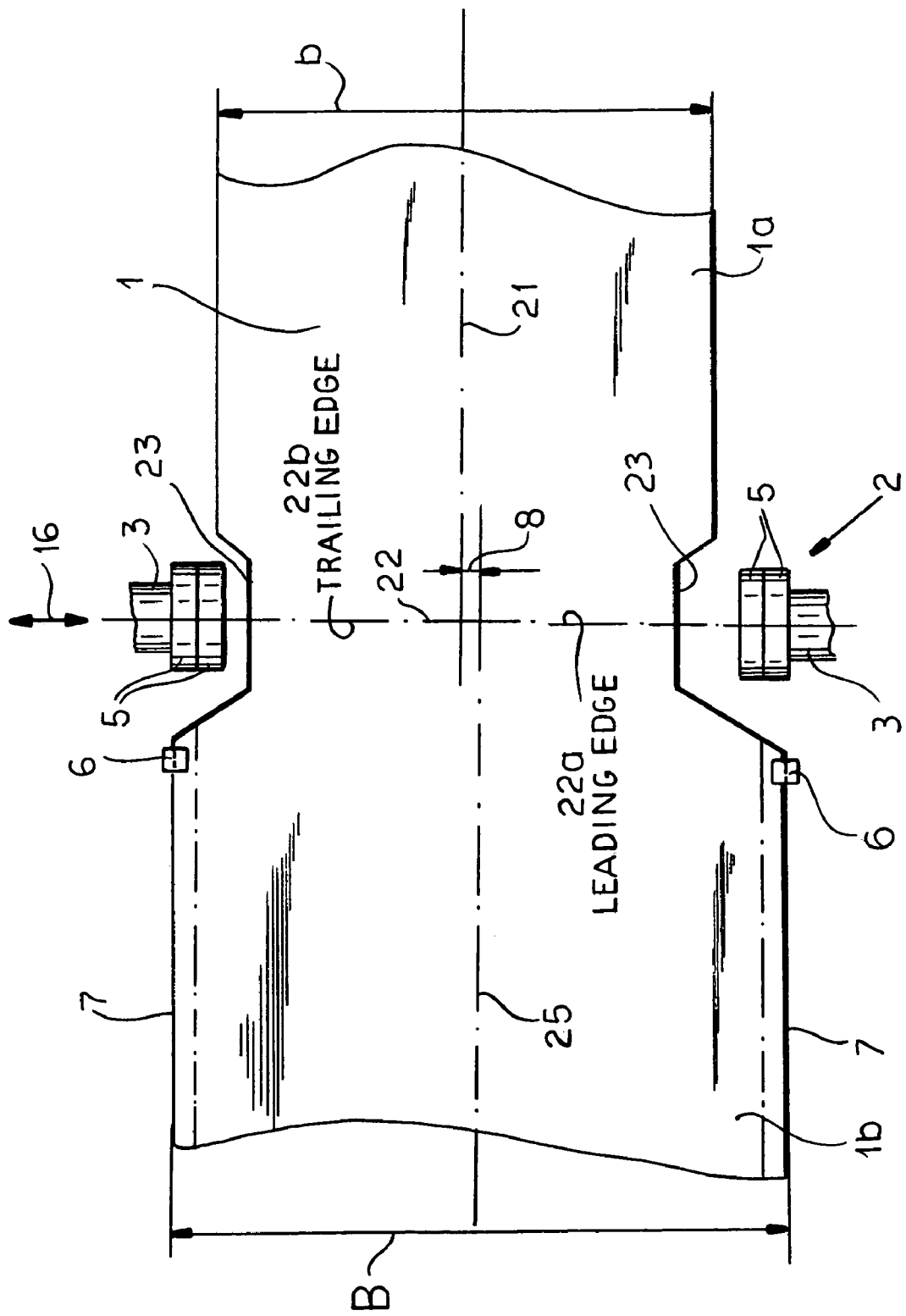
FIG. 3 is a plan view illustrating a system in which segments of a strip have been joined end to end with the successive segments being out of alignment, showing the trimming heads and the sensor elements immediately upstream thereof.

From FIG. 3 it will be apparent that the strip can be joined together from segments 1a, 1b, for example, along a junction 22, e.g. a weld seam, at which cut outs 23 are stamped from the strip to form indentations.

As has been diagrammatically illustrated in FIG. 1, the sensors 6 provide signals to a signal processor or computer 24 which controls the positions of the cutting heads 3 or blades 5 in the band width direction and also controls the centerline positioning actuators 20 in the strip width direction. The sensor may be maintained in line with the respective longitudinal edge 7 via the computer 24 (FIG. 1) thus, before the strip reaches the blade 5, in the case of an endless strip, i.e. one not formed with junctions 22 (between a leading edge 22a and a trailing edge 22b), while the apparatus is at standstill, the portions of the edges 6 and the width B of the strip are detected and the resulting signals control the heads 3 and the blades 5 to advance them into the proper position to trim strips 7a of equal width. The strip is then advanced through the cutting head 3 and the trim removed to leave the strip of width b (new band or strip width). When the strip is formed by joining segments 1a, 1b and indentations or stamps (cutouts) at 23 at the junctions 22, the indentations are brought into registry with the blades 5 (FIG. 3) and at standstill of the strip based upon the measurement by sensors, the cutting heads 3 and/or the centerline actuator 20 are adjusted to position the blades 5 appropriately for the trim to be removed. In FIG. 3, it can be seen that while the cutting heads 3 remove identical-width trim strips from both longitudinal edges the centerline actuator 20 restores the offset 8 so that the centerline 25 of the oncoming strip will be restored to the center of the device corresponding to the centerline 21 with appropriate adjustment of the heads 3.

We claim:

1. A method of trimming longitudinal edges from metal strip which comprises the steps of:
    (a) advancing metal strip to be trimmed along longitudinal edges of the strip along a trimming path in a longitudinal direction and engaging said strip at each longitudinal side thereof with a respective trimming shear head, thereby cutting a respective trim from the respective side along the respective longitudinal edge;
    (b) measuring positions of the longitudinal edges and a width of the strip at a location immediately upstream in said direction of the respective heads; and
    (c) adjusting a position of a centerline of said strip based upon results of the measurement in step (b), before, after or during engagement of blades of said shear heads with said strip whereby said strip centerline is positioned relative to the shear heads and blades thereof, the centerline position being adjusted by passing said strip onto rolls shiftable by an actuator and located upstream of said shear heads.

2. The method defined in claim 1 wherein measurement signals are generated for adjusting positions of said heads or adjusting a position of a centerline of said strip and are applied to a strip centerline control unit.

3. The method defined in claim 1 wherein individual strip segments are joined end-to-end to form a continuous strip having longitudinal edge indentations at each junction between individual strip segments, the blades of said shear heads disengage from said strip at said indentations and the positions of the shear heads or the centerline are readjusted on standstill of the strip while said heads are located at said indentations and for subsequent severing of trim of a given width from the strip.

4. The method defined in claim 3 wherein said trim is of equal width at both sides of said strip.

5. The method defined in claim 1 wherein, for a continuous-length strip, a leading edge of the strip is initially positioned upstream of said shear heads, a centerline of said strip is adjusted relative to said shear heads to define a new band width to be trimmed during a standstill of the strip, and thereafter upon advance of said strip trims of equal width are cut from said strip at opposite longitudinal sides thereof.

6. The method defined in claim 1 wherein, after adjustment of the shear heads with the respective blades and restarting of travel of the strip and during the trimming of the strip, possible offsetting of the strip centerline is counteracted by a centerline positioning mechanism and adjustment of the shear heads to a zero offset until the strip is centered between said shear heads at its centerline.

7. The method defined in claim 1 wherein said strip is hot-rolled strip.

* * * * *